FIG_1

Oct. 22, 1957      W. F. HENRY ET AL      2,810,620

TOLL HIGHWAY RECORDER SYSTEM

Filed Dec. 27, 1955      8 Sheets-Sheet 2

FIG. 2

TOLL COLLECTOR NO. 44771
NAME John Doe

| EX. | 23 |
|---|---|
| ENT | 23 |

| 23 | 5 | AUG. 16 | 3:05 PM | A | 0 | 0 | 0 | 87194 |
|---|---|---|---|---|---|---|---|---|
| 23 | 5 | AUG. 16 | 3:05 PM | A | 0 | 0 | 0 | 87195 |
| L | DATE | | TIME | A | R | E | | Q |

STATE HIGHWAY TURNPIKE
TOUR OF DUTY RECORD

FIG. 3

STUB:

| 2.50 | 0.20 | 1.25 | 1.60 | 2.50 |
|---|---|---|---|---|
| 19 | 11 | 15 | 18 | 23 |

NUMBER 10229
CL. 3

STATE HIGHWAY
TURNPIKE

TICKET:

| 10229 | 3 | 2.50 | 0.20 | 1.25 | 1.60 | 2.50 |
|---|---|---|---|---|---|---|
| NUMBER | CL. | 19 | 11 | 15 | 18 | 23 |

| EX. | 23 |
|---|---|
| ENT | 19 |

| 23 | 5 | AUG. 16 | 2:56 PM | 2 | 1 | 3 | 0 | 87162 |
|---|---|---|---|---|---|---|---|---|
| 19 | 1 | AUG. 16 | 11:56 AM | 3 | 0 | 0 | T | 62891 |
| L | DATE | | TIME | A | R | E | | Q |

STATE HIGHWAY TURNPIKE
ENTRANCE STATION NO. 19
CITY, STATE

*INVENTORS*
WILLIAM F. HENRY
JOSEPH J. PURCELL
BY
ATTORNEY

United States Patent Office 2,810,620
Patented Oct. 22, 1957

2,810,620

TOLL HIGHWAY RECORDER SYSTEM

William F. Henry, Endicott, and Joseph J. Purcell, Endwell, N. Y., assignors to International Business Machines Corporation, New York, N. Y., a corporation of New York Application December 27, 1955, Serial No. 555,532

3 Claims. (Cl. 346—40)

This invention relates in general to a dual-purpose toll highway recorder system which may be set to accommodate vehicles either entering or exiting from the toll highway.

As is stated in copending U. S. patent application Serial No. 398,358, filed on December 15, 1953, by W. F. Henry et al., success of the famous Pennsylvania Turnpike, first of the truly modern "pay-by-the-mile" toll highways, has created a tremendous interest in the business of operating toll highways. Good business of course demands wise economy which, in turn, calls for accurate and honest records. As will be described in detail hereinafter, the preferred embodiment of this invention causes accurate information relating to the operation of a toll highway to be recorded on vehicle trip cards and toll collector tour-of-duty cards so that dishonest practices and/or unintentional errors may be readily detected. It would be well to mention here that a trip card is associated with a vehicle passing over the toll highway, whereas a tour-of-duty card is associated with a toll collector's tour of duty and is used for much the same purpose as are ordinary time cards.

The dual-purpose, so-called In-Out type toll highway recorder system to be described hereinafter, is one which may be used to accommodate vehicles either entering a toll highway or exiting from the same. That is, this is a system including a single toll recorder which is associated with two axle treadles each of which is located in the toll highway recorder lane on each side of the toll recorder. Dual-purpose recorders are used primarily to alleviate relatively short time peak vehicle loads in either direction. For example, referring to Fig. 1, during the morning hours the dual-purpose recorder 14 may be set to accommodate vehicles entering the toll highways so as to provide two In lanes and only one Out lane at the toll highway terminal, whereas during the evening hours the dual-purpose recorder 14 may be set to accommodate vehicles leaving the toll highway so that there are two Out lanes and only one In lane at the highway terminal. At all times other than the afore-mentioned morning and evening peak loads, the dual-purpose recorder may be rendered inactive if so desired, whereby only one In lane and one Out lane are provided at the terminal.

Along with the provision of a simple means whereby the dual-purpose recorder system may be changed from an entrance recorder system to an exit recorder system, and vice versa, the possibility of dishonest practices and/or unintentional errors is greatly enhanced. Accordingly, a general object of this invention is to provide an improved toll highway recorder system for detecting and recording dishonest practices and/or unintentional errors.

In line with the foregoing, it is another object of this invention to provide an efficient dual-purpose toll highway recorder system for discouraging, and actually preventing, dishonest practices.

In the preferred embodiment of this invention, the dual-purpose toll recorder 14 (see Fig. 1) is installed in a toll, or vehicle stop, booth 12 in which the toll collector is stationed. One treadle 15 for counting axles of vehicles entering the toll highway is located in the two-way lane 300 a few feet beyond the toll both 12 opposite which the vehicles must first stop, and another treadle 315 for counting axles of vehicles exiting from the toll highway is located in the same two-way lane a few feet in the other direction beyond the toll booth 12 opposite which the vehicles must stop. A directional relay unit which can be associated with either of the treadles 15 or 315 at any one time distinguishes between axles passing over a treadle in a forward direction and in a reverse direction whether the toll recorder 14 is set for In or Out traffic so as to provide a separate record of all axle counts. If the treadle 15 is active, a vehicle is moved in the forward direction onto the toll highway. On the other hand, if the treadle 315 is active, a vehicle is moved in the forward direction away from the toll highway.

In the preferred embodiment of the present invention, to change the In-Out setting of the dual-purpose recorder and to operatively associate the directional relay unit with the single one of the treadles 15 or 315 to be rendered active, the toll collector must first shift a card receiver of the toll recorder to the other of two card receiver settings; i. e., since there are only two directions of vehicle travel, there need be only two card receiver settings. As to be made clear shortly, shifting the card receiver mechanism alone will not disable one treadle and activate the other treadle. It might be explained that this is the case, however, with the improvement covered in copending U. S. patent application Serial No. 422,788, filed on April 13, 1954. To effect what might be termed a treadle shift, i. e., the disabling of treadle 15 and the activation of treadle 315 for example, in the present toll recorder system, it is necessary to follow the shifting of the afore-mentioned card receiver mechanism with a cyclic toll recorder operation. This is to keep the toll collector from disabling the treadles selectively for any given single vehicle simply by shifting the card receiver mechanism, in order to prevent any record of the said vehicle from being made. For example, assume that a vehicle 10 (Fig. 1) approaches the toll highway via the center In-Out lane 300 while the same is being used as an In lane. Thus, only treadle 15 will be operatively connected to toll recorder 14 and as the vehicle passes over the disabled treadle 315, no record of the same would be made. It would normally be a simple matter for the toll collector to render the Out treadle 315 active and the In treadle 15 disabled by simply shifting the trip card receiver mechanism after he had collected the toll fare while the vehicle in point was actually between the two treadles and opposite the toll booth 12. Thus, since the vehicle would then pass over disabled treadle 15, there would be no record whatsoever of the vehicle having passed through the toll highway terminal station shown in Fig. 1. Consequently, the toll fare collected by the toll collector could be kept by him for his own personal use.

To prevent practices of the foregoing kind, it is another object of this invention to provide a dual-purpose toll highway recorder system whose setting cannot be altered without a cyclic toll recorder operation after the system has been conditioned for a new setting.

The foregoing feature is described in detail in the last section of this specification, which section is entitled "Treadle Switching Circuits."

Other objects of this invention will be pointed out in the following description and claims, and illustrated in the accompanying drawings, which disclosed by way of example, the principle of the invention and the best mode, which has been contemplated, of applying that principle.

In the drawings:

Figs. 6a–6d, taken together, constitute a wiring diagram of the machine.

*General description*

Prior to describing the various mechanical and electrical components of the present invention which cooperate to afford an improved toll highway recorder system, the same will first be described briefly and in a general way so as to provide a general explanation of the over-all operation of the apparatus used in the system.

A toll highway recorder system includes at least two highway terminals, one a vehicle entrance station and the other a vehicle exit station. Since the preferred embodiment of this invention can be used at either highway terminal, only a single dual-purpose toll recorder highway apparatus as is shown in block form in Fig. 1 will be described. The booths 311 and 312 house Out and In toll recorders, respectively.

Figure 1:
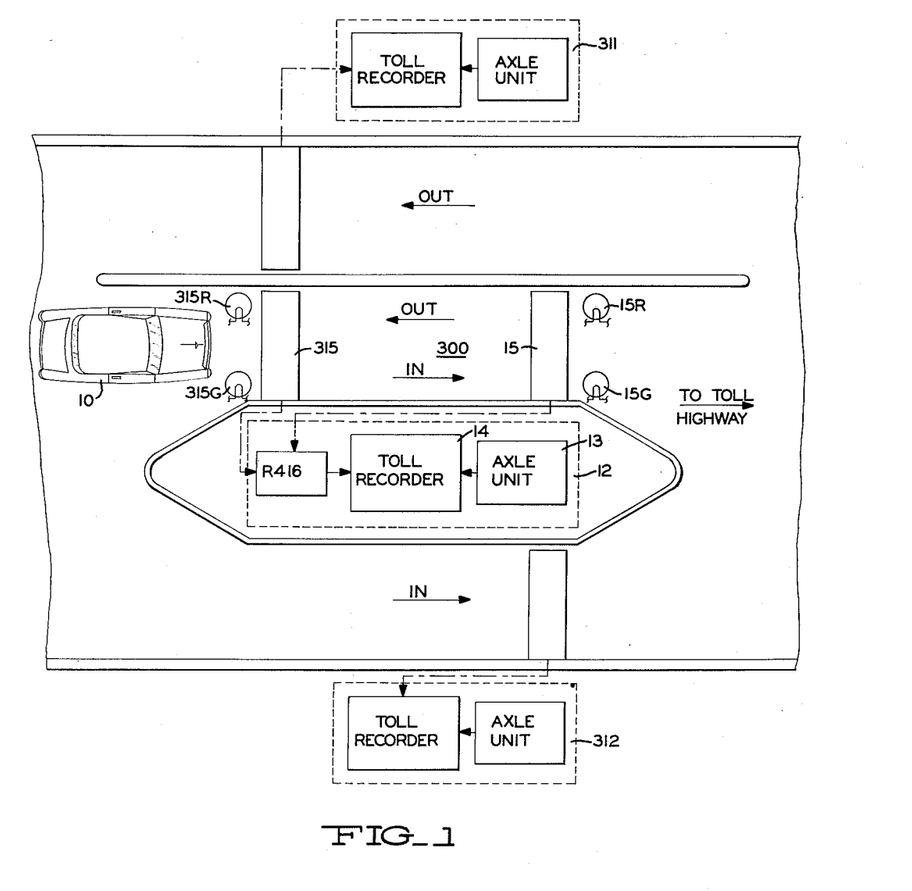
Fig. 1 is a block diagram of a typical multi-lane toll highway terminal whereat the preferred embodiment of the present invention is utilized in conjunction with an In-Out lane.

Let it be assumed first that the toll recorder apparatus 14 shown in Fig. 1 is set to operate in conjunction with a vehicle entrance station. Thus, a vehicle 10 which is entering the toll highway via an In lane, e. g., the center In-Out lane 310, must first be stopped at the entrance station represented by toll booth 12 so that specific vehicular information relative to the toll recording operation, may be entered upon a trip card 11 (see also Fig. 3). This vehicle is caused to stop opposite toll booth 12 for examination by the toll collector after having passed over disabled treadle 315, whereupon the toll collector makes a determination as to the classification of the vehicle. The basis for classification of different types of vehicles is preferably outlined by the authority which controls the operation of the toll highway. This authoritative body may, for example, assign a classification 1 to all passenger vehicles whose manufacturer's, or licensing, weight is under 3500 pounds, and a classification 2 to all passenger vehicles whose weight is over 3500 pounds. The aforesaid body may further determine that lightweight delivery trucks, for example the so-called quarter ton pick-up trucks, are in classification 3, etc.

The toll collector at the entrance station is supplied with different groups of trip cards, each group corresponding to a different vehicle classification category. This, of course, is necessary in view of the fact that the vehicle classification is a partial determining factor of the toll or fare to be paid by a vehicle operator for the privilege of passing over the toll highway.

In addition to determining the classification of the vehicle, the toll collector manually sets up an axle count by way of an axle count lever (not shown) in axle unit 13, the said count corresponding to the number of axles on vehicle 10.

Figure 3:
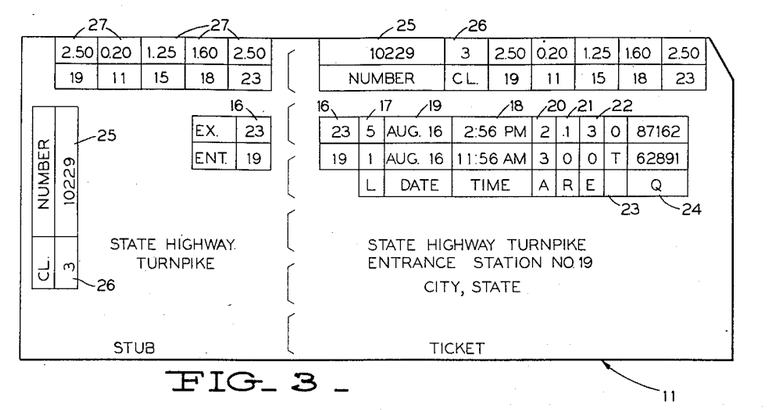
Fig. 3 is a view of a vehicle trip card.

The toll collector next must obtain a trip card 11 from the group of the class corresponding to the vehicle classification, which trip card is located in a convenient card rack for insertion into the card receiver of the toll recorder 14. As is shown in Fig. 3, trip card 11 has the general appearance of the well-known IBM tabulating record card. Complete insertion of the trip card will render electric circuits operative which cause the following information to be recorded upon the card along the vehicle entrance line labeled "ENT.":

(1) The entrance station terminal number in column 16.

(2) The lane number in column 17 to indicate the lane through which vehicle 10 passes to enter the toll highway.

(3) The time in column 18, and the day in column 19, at which the trip card has the information entered thereupon.

(4) The number of vehicle axles in column 20, said number being set up in manually settable axle unit 13 (see also Fig. 1).

(5) The number of reverse axles in column 21, to indicate the number of axles carried by the vehicle preceding vehicle 10 and crossing treadle 15 in a reverse direction.

(6) An axle error count in column 22, to depict the difference count between the actual number of axles carried by the vehicle preceding vehicle 10 and the number of axles set up on axle unit 13 for the said preceding vehicle.

(7) A power failure "P," or a weighted treadle "T," or a properly functioning recorder "O," in column 23.

(8) A toll recorder operation sequence count in column 24.

As is shown in Fig. 3, each trip card also has imprinted thereon at both ticket and stub portions, the following information:

(1) Trip card sequence number in column 25.

(2) Vehicle classification number in column 26.

(3) The toll amount in column 27, the amount that is due to be paid when the vehicle leaves the toll highway at any one of the designated exit stations.

After the trip card is processed in the "entrance" toll recorder 14 (Fig. 1), the trip card is removed from the card receiver and placed into the custody of the vehicle operator. The operator is then permitted to leave the entrance station and to pass over the toll highway towards his destination and to the terminal at which an exit station is located.

Prior to entering the toll highway proper, however, vehicle 10 passes over the active axle treadle 15. The number of axles passing over the treadle in a forward direction, i. e., in a direction towards the toll highway, are accumulated in a forward axle counter. In the event the vehicle is moved over the treadle in a reverse direction after having passed over the treadle in a forward direction, the number of axles passing over the treadle in the reverse direction will be accumulated in a reverse axle counter. Both of the afore-mentioned counters are located within toll recorder 14, and are used to control the printing upon trip card 11 (Fig. 3) of the information designated by reference numerals 21 and 22.

The number of axles passing over treadle 15 (Fig. 1) in a forward direction is automatically compared with the axle count set up manually on axle unit 13 by the toll collector. This provides an axles-in-error indication, be there any, which is designated by reference numeral 22, and is effected in the following fashion:

The selection of a number of axles on axle unit 13 causes the tens complement, or a subtractive, count of the vehicle axles set up by the axle count lever on the unit to be entered in an axle count accumulator in toll recorder 14. On the other hand, the passing of the vehicle for which the axle unit was set up, over axle treadle 15, causes an additive count of the actual number of axles to be entered in the afore-mentioned accumulator. Of course, if the data representing the two axle counts are equal, the accumulator will have a zero total after the said vehicle passes completely over the treadle. If, however, one axle count is more or less than the other axle count, the axle count accumulator in toll recorder 14 will have a plus or minus total, respectively, therein. It is apparent that since the trip card associated with the vehicle is processed before the vehicle passes over treadle 15, the axles-in-error indication in column 22, i. e., the axle count difference represented as a total in the axle count accumulator, cannot be entered upon the trip card associated with the vehicle, but must be entered upon a trip card processed subsequent to the vehicle passing over the treadle. In the present preferred embodiment, the next card processed after the vehicle passes over the treadle is selected to have this information recorded thereon. This feature is shown and described in detail in the afore-mentioned copending U. S. patent application Serial No. 398,358.

Let it now be assumed that the dual-purpose toll highway recorder apparatus 14 shown in Fig. 1 is set to operate at a vehicle exit station, the vehicle 10 is stopped opposite toll booth 12 prior to passing over active Out treadle 315 after having passed over disabled In treadle 15. The vehicle is examined once again, but by an exit station toll collector, whereupon the number of vehicle axles is determined for a second time. Thus, in accordance with the number of axles determined by the exit collector to be on the vehicle, the toll collector will manually set up an axle count in axle unit 13. Trip card 11 which was initially placed into the custody of the vehicle operator at the entrance station, is now taken by the exit station toll collector for insertion into the card receiver of exit station toll recorder 14. Complete insertion of the trip card into the card receiver will render the toll recorder apparatus operative whereby the same type of information as is recorded at the entrance station, is recorded at the exit station along the exit line designated "EX." (see also Fig. 3).

After this trip card 11 which is associated with vehicle 10 is processed at the exit station, the toll collector will determine the toll to be paid by the vehicle operator. This determination is made by referring to a toll chart comprising columns 27 each having toll data imprinted upon the face of the trip card. The amount of toll to be paid for the privilege of passing a vehicle over the toll highway is selected from this chart simply by reading the amount designated above the coded exit station number. The amounts imprinted upon the trip card are initially determined by the toll highway authority on the basis of distance traveled over the toll highway by the vehicle operator, and the classification of the vehicle. This means, of course, that each entrance station must have assigned thereat different groups of trip cards each of which is associated with the station.

Two types of irregular operation of a toll highway recorder apparatus, which are explained in detail in the copending U. S. patent application, Serial No. 422,788, filed by W. F. Henry et al. on April 13, 1954, are indicated on a trip card processed after the irregularity is corrected. These irregular operations are designated as a power supply interruption and a weighted-treadle condition. A power supply interruption will cause the letter "P" to be recorded in column 23 during the first recorder operation after power is restored. A weighted-treadle will cause the letter "T" to be recorded in column 23 during the period of the irregularity, and during the first recorder operation after the weighted-treadle condition is corrected. In addition to lighting a signal light in response to any one of given irregularities, a toll recorder governing means is controlled so that a toll recorder operation is not automatic upon the insertion of a trip card into the card receiver. An error switch must be depressed so as to assure that the attention of the toll collector is directed to the irregularity.

Figure 2:
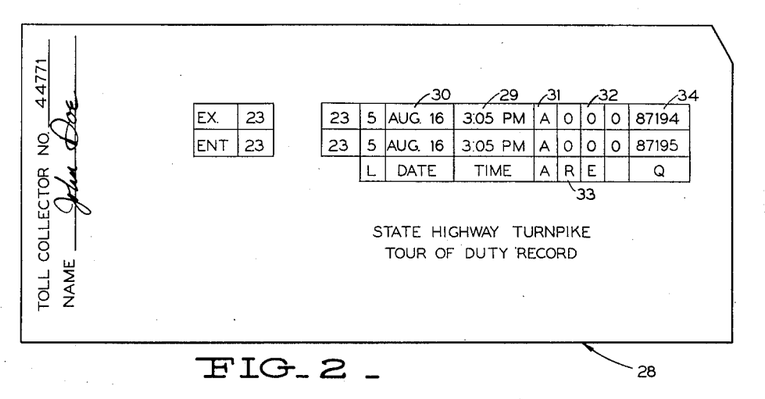
Fig. 2 is a view of a tool collector's tour-of-duty card.

The toll recorder can also be used to register the toll collector's attendance time on a tour-of-duty card 28 (see Fig. 2) which is similar to trip card 11. For this function, an axle selection lever in axle unit 13 is set to an "A" position so that an axle count is not entered into the axle count accumulator in recorder 14. A tour-of-duty toll recorder operation, however, will cause the register of time in column 29 and the date in column 30, in addition to an "A" for attendance in axles column 31. Any axle error count and reverse axle count data that are stored in the recorder 14 due to the action of a preceding vehicle, is also recorded in columns 32 and 33, respectively, as is the sequence number of recorder operation in column 34. It may readily be seen that when the toll collector registers his attendance at the beginning and at the end of his daily work shift by means of the toll recorder assigned to him at his post of responsibility, the sequence number difference count will signify the number of toll recorder operations effected during his tour of duty.

As mentioned hereinbefore, to alter the setting of the present dual-purpose recorder system, it is necessary to follow the shifting of the card receiver mechanism therefor with a cyclic toll recorder operation. That is, if while the treadle 15 (Fig. 1) is active it is desired to change the center lane to an Out lane, the card receiver of toll recorder 14 must first be shifted to its other position. This action conditions the toll recorder system for the action that will take place in response to a toll recorder operation. That is, Out treadle 315 will be activated and In treadle 15 will be disabled.

*Drive mechanism*

Inasmuch as the drive mechanism for the subject toll recorder is described in detail in Patent No. 2,693,316 which issued on November 2, 1954, to A. B. Benson et al., the said drive mechanism will be described herein only briefly so as to avoid undue prolixity.

Figure 4:
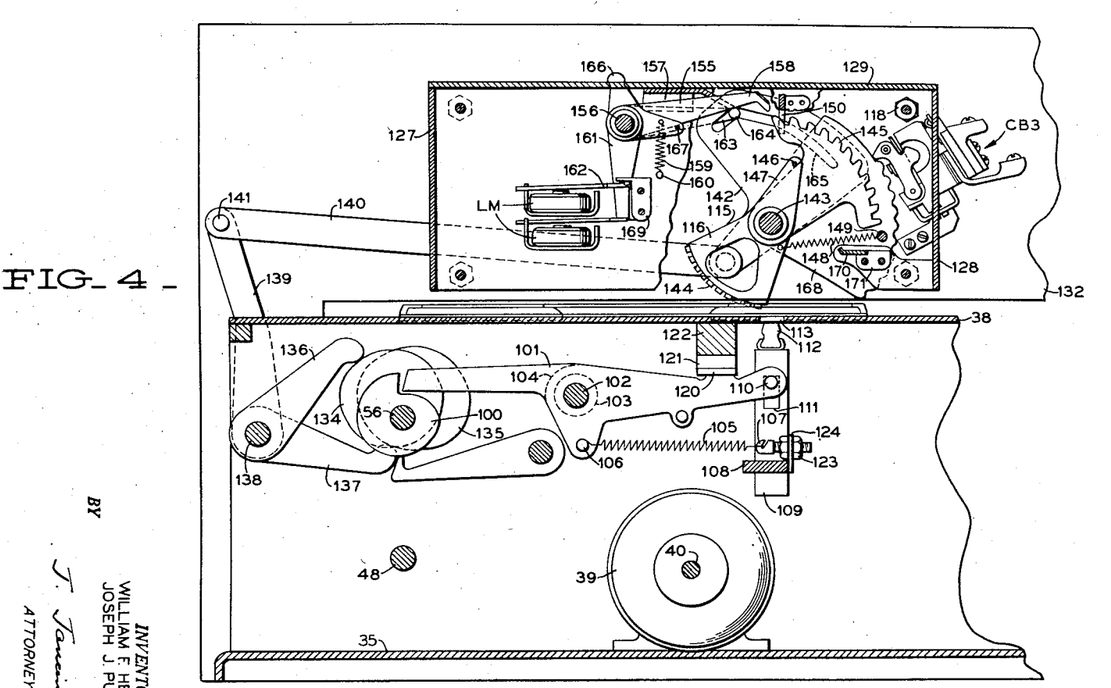
Fig. 4 is an elevational view of the printing and hammer mechanism.

Referring to Fig. 4, the lower half of the recorder mechanism is housed within a box-like structure comprising a base plate 35, a top plate 38, and a plurality of sideplates. Looking at the back of the machine, as viewed in Fig. 4, there is shown supported on the base plate 35 a drive motor 39 having a drive shaft 40 which by suitable drive means including a belt, pulleys and a gear train, is adapted to operate a large gear (not shown) rotatably mounted on a shaft 48 journaled in the front and rear plates. Fixed to shaft 48 is another gear (not shown) which is used to drive the main cam shaft 56 also journaled in the front and rear plates.

A single cycle clutch, described in detail in the aforementioned patent, is provided to connect shaft 48 and other driven mechanism to drive mechanism represented by motor 49 and continuously rotating shaft 40. When solenoid 65 (see also Fig. 6a) is energized by electrical means to be later described, the afore-mentioned clutch is operated so as to cause a recorder operation. A mechanical interlock provision is made so that if for any reason solenoid 65 should remain energized longer than one cycle, only a single recorder operation will nevertheless be effected.

The rear plate supports a synchronous motor 91 (Fig. 6a) whose shaft has fastened thereto for rotation therewith a single lobe cam 93. The cam is caused to make one revolution per minute as long as power is applied to the synchronous motor in the recorder. Furthermore, the cam 93 operates upon a pair of timer contacts 94 mounted in a block which is also attached to the rear plate. The timer contacts 94 will close once each minute, and are provided to advance the time and date printing wheels (not shown).

Printing mechanism

The printing of data on the record card is accomplished by means of a cam controlled print hammer. Referring to Fig. 4 once again, the main cam shaft 56 supports the cam 100 which has an associated hammer link 101 pivotally mounted on a shaft 102 which, in turn, extends between the front and rear plates. The hammer link 101 has as an integral part thereof a collar 103 which is pivoted on shaft 102 and is jointed to a second link 104 pivoted on shaft 102. The link 101 is normally urged counterclockwise against the periphery of cam 100 by a spring 105 extending between a stud 106, connecting said links 101 and 104, and a threaded anchor 107 fastened to a guide member 108. The guide member 108 is fastened between the front and rear plates 36 and 37.

The two links 101 and 104 embrace a printing hammer 109 and are connected thereto by means of a pin 110 which extends through a slot 111 in the hammer. The hammer 109 is slideable in the guide member 108 and has mounted on its top edge a platen 112 which extends along an opening 113 in the top plate 38. The hammer 109 is moved upward with the platen 112 driving the record card against an inked ribbon (not shown) and the type sectors 115 and 116 each time that the hammer link 101 drops off the high dwell of cam 100, said cam 100 making one revolution each time that the motor contacts 80 (see also Fig. 6a) are closed consequent upon the energization of solenoid 65. The upward blow is cushioned by means of a shoulder 120 on the hammer links 101 and 104 contacting a rubber block 121 attached to bar 122 which extends between the front and rear plates 36 and 37. The strength of impression of the hammer may be adjusted to compensate for varying the thickness of the record card by adjusting the threaded anchor 107 to which the tension spring 105 is attached. The lock nut 123 positions and retains the anchor in the plate 124 which forms a part of the guide member 108.

The sector mechanism is housed within a box-like structure which is supported above the top plate 38. The structure comprises a front plate, a rear plate, two side plates 127, 128 and a top plate 129. The front and rear plates are positioned by threaded spacers which are fastened to the rear plate by screws, and the entire structure is supported on the front wall of the recorder casing by means of suitable screws.

The operation of the printing sector mechanism is under control of a pair of complementary cams 134 and 135 (Fig. 4) fastened on the main cam shaft 56 of the recorder. When shaft 56 is caused to make a revolution, as previously described, said complementary cams will act upon a pair of associated follower arms 136 and 137 fastened to a shaft 138 journaled in the front and rear plates to cause said shaft 138 to oscillate, first in a clockwise direction and then in a counterclockwise direction. Fastened to the shaft 138 is a lever 139 which is connected to a driving link 140 by means of a stud 141. The other end of driving link 140 is fastened to a cam member 143 which is fastened on a sector shaft 143 journaled in the front and back plates, and as a result, shaft 143 will oscillate with shaft 138.

Pivotally mounted on shaft 143 are two type sectors 115 and 116 for printing the number of axles-in-error in column 22 (see also Fig. 3) and the number of reverse axles in column 21, respectively. Each of these sectors contains a series of ten type elements 144 for printing the numerals 0–5 inclusive. The upper portions of sectors 115 and 116 each contain a series of ten ratchet tooth spaces 145 which are used, as will presently be seen, to selectively position a desired type element 144 at the printing station above platen 112. In normal position, the sectors are urged counterclockwise against a bail 146 fastened to a bail link 147 which is fixed to shaft 143, by means of springs 148 extending between the sectors and a stud 149 fastened between the front and back plates. It may be seen, then, that during the rotation of main cam shaft 56, the link 140 and cam member 142 will rotate shaft 143, bail link 147 and the sectors 115 and 116 first in a counterclockwise direction and then in a clockwise direction, the ratchet portions having tooth spaces 145 moving through slots in a guide plate 150 fastened between the front and rear plates.

The mechanism for selectively positioning the sectors for printing comprises latch levers 155, one for each sector, pivotally mounted on a shaft 156 journaled in the front and the back plates. The levers are positioned along the shaft 156 by a comb member 157 so that the hooked end 158 of each one can act on the ratchet teeth of a corresponding sector. They are normally urged in a clockwise direction for engagement with the ratchet teeth in the sectors by springs 159 extending between the levers and a stud 160 fastened between the front and intermediate plates. The latch levers 155 have downwardly extending portions 161 of varying lengths which are notched at the bottom and which are each normally latched against related armatures 162 of latch magnets LM mounted in staggered relationship. In the latched position, as shown in Fig. 4, the hooked ends 158 of the latch levers 155 are clear of the ratchet teeth in the print sectors due to the engagement of the armatures 162 and related extended portions 161.

Fastened on the shaft 156 is an arm 163 having a stud 164 which rides in a cam slot 165 in the cam member 142. The cam slot 165 is arranged so that the oscillation of shaft 143 and the cam member 142 is imparted to shaft 156 through arm 163. Also fastened on the shaft 156 is a bell crank lever 166, the lower arm of which has fastened thereto a stud 167 which extends underneath all of the latch levers 155. The upper arm of bell crank lever 166 extends through a slot in top plate 129 and is used to actuate a ribbon feed mechanism.

The operation of the selector mechanism is under control of a circuit breaker cam 168 fastened on shaft 143 and having a series of nine lobes on its periphery which function to open and close a pair of associated circuit breaker contacts mounted in a conventional circuit breaker unit CB3 attached to the front plate. As will be more clearly understood in connection with the circuit description of the toll recorder, the counters in the machine receive "manually-settable" axle-count pulses and moving vehicle axle treadle pulses. When the toll recorder is conditioned to take a print cycle, the main cam shaft 56 will make one revolution, as previously described, during which time the sector shaft 143 will be driven first in a counterclockwise direction (Fig. 3) and then in a clockwise direction through the driving link 140 and the cam member 142. As shaft 143 moves counterclockwise, the bail link 147, print sectors 115 and 116 and circuit breaker cam 168 will also move counterclockwise with the circuit breaker cam closing cam contacts CB3 to direct impulses to a counter in the toll recorder. Each sector will continue to follow the bail link 147 until its related latch magnet LM receives an impulse from the related counter, which occurs when the said counter reaches zero, as will be shown later in connection with the circuit diagram. Energization of a latch magnet LM will draw the related magnet armature 162 downwardly to thereupon unlatch the latch lever 155. Latch lever 155 will then be spring moved clockwise into engagement with the proper notch in the related sector ratchet thereby stopping further movement of the sector with bail 146. Hence, the type element 144 in position for printing will represent the number which had been stored in the corresponding counter, as will appear more clearly when the circuit diagram is described.

It will be noted that as cam member 142 moves counterclockwise, arm 163 will cause shaft 156 to rotate clockwise carrying with it bell crank lever 166. As a result, stud 167 on bell crank lever 166 is moved away from the latch levers 155 leaving them free to be pivoted into engagement with the ratchet sectors. A slotted guide bracket 169 is fastened between the front and intermediate plates to guide the lower portions 161 of latch levers 155.

After the bail link 147 reaches the limit of its counterclockwise movement and all of the sectors have been positioned, the printing hammer 109 is tripped off, as previously described, and a recording is made. Any of the sector plates that were not required to be stopped by the latch levers 155 will be stopped by projecting fingers 170 on a stop bracket 171 fastened to the front plate 126. At the end of the printing cycle, the complementary cams 134 and 135 will cause the sector shaft 143 to commence rotating in a clockwise direction. As cam member 142 begins to rotate clockwise, arm 163 will pivot shaft 156 counterclockwise and the stud 167 on bell crank lever 166 will lift all of the latch levers clear of the ratchet teeth on the print sectors. The bail link 147 will restore all of the sector plates back to their home position and the shaft 143 will carry the circuit breaker cam 168 back to its home position. The extended portions 161 of latch levers 155 are latched back on the armatures 162 of the latch magnets LM when levers 155 are pivoted clear of the ratchet teeth in the sectors.

Axle select lever print mechanism

As described previously, the toll collector manually sets up an axle count in axle unit 13 (Fig. 1). This unit includes an axle select lever (not shown) which is mounted for movement on front wall 132 (see also Fig. 4), the said lever being manually set by the toll collector to correspond with the number of axles on the vehicle being checked. As described fully in the aforementioned patent, the said lever may be set to any position A, and 1 through 7.

This lever is used to position a print sector somewhat similar to sector 116 shown in Fig. 4, so that the type element thereon selected for printing corresponds to the corresponding selected position A and 1 through 7. Whenever the toll collector on duty processes a tour-of-duty card at the beginning and at the end of a tour-of-duty, or shifts the card receiver from one position to another, the afore-mentioned lever is set to position A. This lever is set to the same position whenever a tour-of-duty card is inserted into the card receiver of the toll recorder prior to shifting the card receiver from one position to the other. Whenever the said lever is set to position A, cam contacts CB4 (see also Fig. 5) are not operated to control count impulses to the axle control accumulator.

In a normal vehicle trip card processing operation, the aforesaid lever is set to a position corresponding to the number of axles determined to be carried by the vehicle being checked by the toll collector. For example, if it is determined that such a vehicle has three axles, this lever is set to position 3 in order to move the print sector controlled thereby to a position whereat the type element for printing a three in the axle selected column 20 (see also Fig. 3) is at the printing station. Subsequent operation of the toll recorder causes operation of cam contacts CB4 whereby a number of impulses equal to the tens complement of the axle count represented by the position of the said lever, is transmitted. That is, assuming the lever to be set to position 3, seven impulses are directed from cam contact CB4 to the axle control accumulator.

Card receiver shift mechanism

Figure 5:
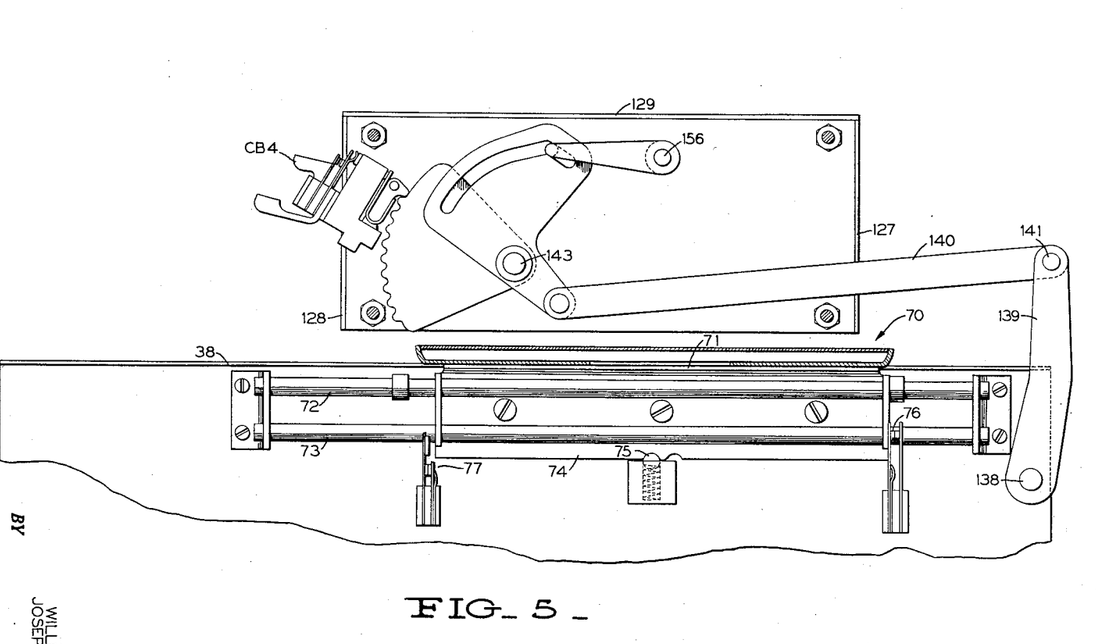
Fig. 5 is an elevational view of the manually shiftable card receiver mechanism.

As is shown in Fig. 5, the card receiver 70 may be moved to the left so as to be in the exit position, or to the right so as to be in the entrance position. The card receiver includes a bed 71 which is positioned on two horizontal guide rails 72 and 73 for movement therealong. Attached to the bed is a bracket 74 having two recesses therein, each adapted to accept a spring urged detent ball 75. As is shown, the ball acts to detent the card receiver in whatever position the latter is placed.

The card receiver causes contacts 77 to open whenever the receiver is set to an exit position, and contacts 76 to close whenever the receiver is set to an entrance position. The contacts are so adjusted that one set of contacts is opened and the other set is closed during the time that the card receiver is being shifted from one position to the other. The purpose of the contacts will be described in detail hereinafter in the Circuit Description.

Operational circuits

Figure 6A:
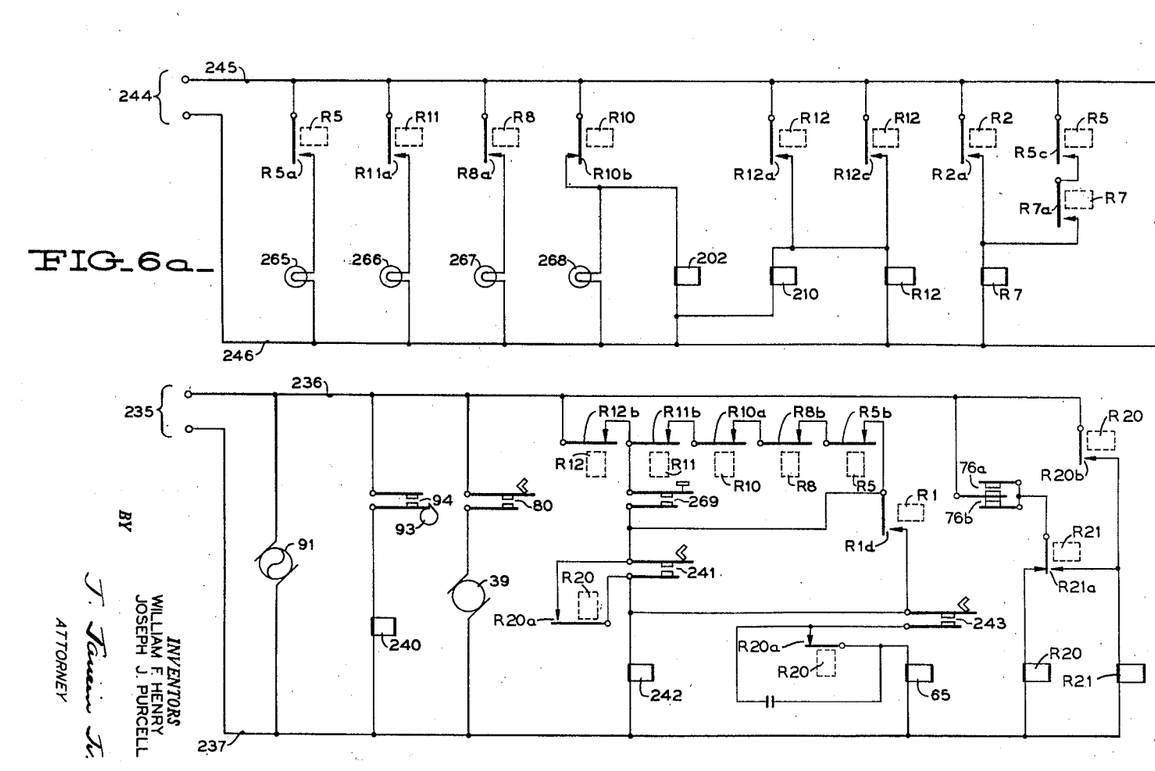

*General description.*—Referring to Fig. 6a, suitable electrical power, e. g., 115 volts, is directed from source 235 to lines 236 and 237. Similarly, direct current power, e. g., 48 volts, is directed from source 244 to lines 245 and 246.

As is shown, synchronous timing motor 91 is operated continuously so long as the toll recorder is connected to source 235, and thereby causes a cam 93 connected to the shaft thereof, to rotate at a speed of one revolution per minute. Accordingly, cam contacts 94 are closed once each minute to complete a circuit to time control solenoid 240. This solenoid which is represented as solenoid 40 in Fig. 3 of Rast Patent No. 2,281,998, which issued on May 5, 1942, operates a clutching means to connect a drive motor to a time indicating type wheel unit for printing the time in column 18 (Fig. 3) of the trip card. The type wheel unit consists of a minute wheel, an hour wheel and an AM-PM wheel, each of these wheels being advanced at the proper time. Inasmuch as the time apparatus is described in detail in the aforementioned Rast patent, and since this apparatus is not an essential feature of the instant invention per se, the said apparatus will not be described herein any further so as to avoid undue complexity and unnecessary prolixity.

Referring to Fig. 6a once again, insertion of a trip card into the card receiver of the toll recorder engages a card lever which closes card contacts 241 so as to complete a circuit to card hold solenoid 242 from line 236 through relay contacts R12b, R11b, R10a, R8b, R5b, card contacts 241, and card hold solenoid 242, to the other side of the line. Energization of solenoid 242 operates a card hold lever (not shown) for gripping the trip card so that the latter cannot be removed from the card receiver until after the card processing operation is completed. Solenoid 242 also closes contacts 243 through a suitable mechanical means (not shown) so as to energize main drive clutch solenoid 65. This sequence of operation assures the proper insertion and retention of the trip card in the card receiver prior to the start of the toll recorder print cycle. As described hereinbefore, energization of clutch magnet 65 causes a single toll recorder print operation to take place.

Figure 6B:
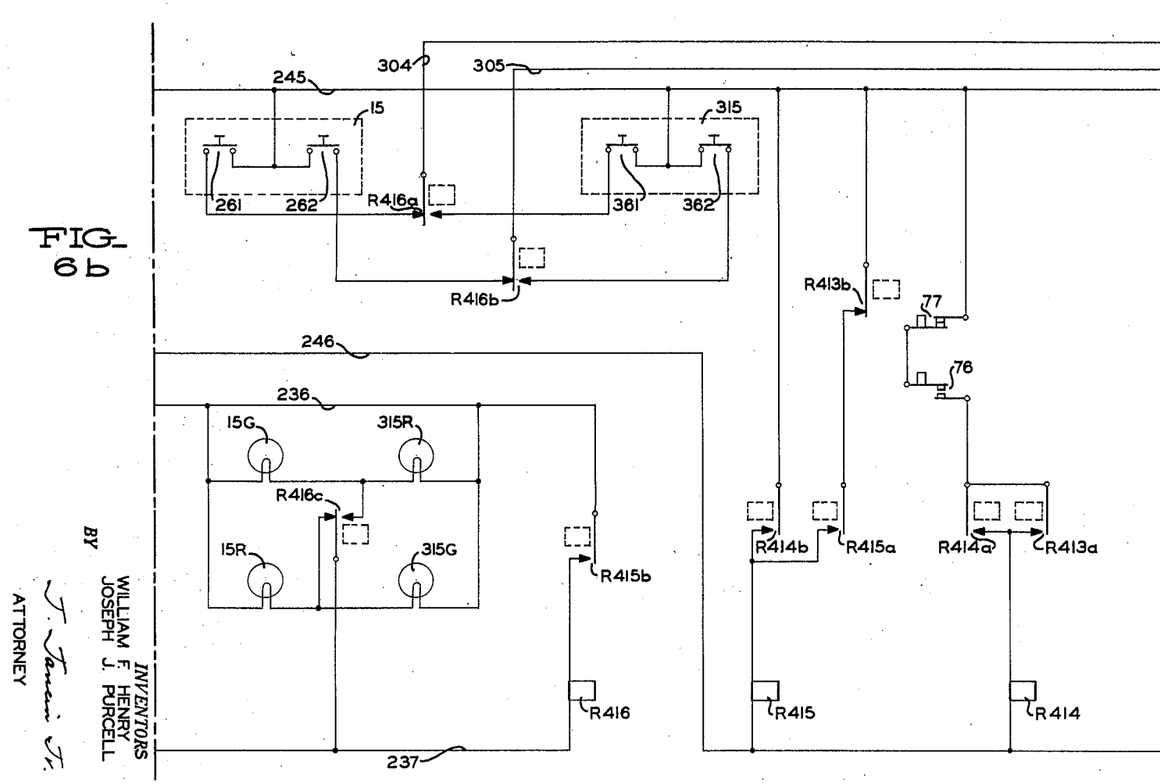

*Forward counter operation.*—Referring to Figs. 6b and 6d, when vehicle wheels attached to an axle pass over treadle 15 (see also Fig. 1) in a forward direction, forward contacts 261 and reverse contacts 262 are closed and opened in succession to thereupon enter a single axle count into forward axle counter 253. As will be described shortly, in order to enter an axle count into this counter, it is necessary for contacts 261 to close first, contacts 262 to close before contacts 261 open, and contacts 262 to open last.

Let it be assumed that a single axle of a vehicle is being moved in a forward direction over treadle 15 while it is in an active status, forward contacts 261 are closed first to complete a circuit to relay R16 (Fig. 6c) via contacts R416a normally closed (n/c) (see also Fig. 6b) and line 304. The energization of relay R16 causes a circuit to be completed to relay R17 from line 245 through contacts R16a, R14c, n/c, relay R17, to line 246. This causes a hold circuit for relay R17 to form from line 245 through contacts R16c, R17b and R14c n/c.

Relay R13 is energized when reverse contacts 262 in treadle 15 are closed by a circuit via contacts R416b and line 305. The closing of contacts R13c completes a second hold circuit for relay R17 from line 245 through contacts R13c, R17b and R14c n/c. It is to be observed that had relay R16 been de-energized prior to the energization of relay R13, relay R17 would have been de-energized when the hold circuit therefor including contacts R16c, opened.

Further movement of the vehicle in a forward direction permits treadle contacts 261 to open so as to cause relay R16 to de-energize. This allows a circuit to form so as to energize relay R18 from line 245 through contacts R13a, R17c normally open (n/o), R16d, relay R18, to the other side of the line. A hold circuit is immediately formed from line 245 through contacts R3b, R18a and R16d.

The complete passage of the vehicle over the treadle in a forward direction allows treadle contacts 262 to open after forward contacts 261 have opened, to thereupon effect de-energization of relay R13. Hence, relay R3 is energized from line 245 through contacts R13b, R16b, R18d, relay R3, to line 246. This causes contacts R3b to open, whereupon the hold circuit to relay R18 is disrupted, and the latter relay is caused to drop out. This action, in turn, causes contacts R18d to open so as to de-energize relay R3.

Referring to Fig. 6d, it may be seen that forward counter magnet 255 is pulsed once when contacts R3a are caused to close; that is, a circuit is completed from line 245 through contacts R3a, R6d, magnet 255, to the other side of the line.

Forward and reverse counters 253 and 247, respectively, each are of the step-by-step operated type described in Lake et al. Patent No. 2,480,744, which issued on August 30, 1949. The counters used in the present preferred embodiment are somewhat modified versions of the Lake accumulator. For example, a spring is used to return the armature (armature 23 in Fig. 1 of the Lake patent) instead of a magnet (magnet 22 in Fig. 1 of the Lake patent). However, in view of the fact that the counters used in the toll recorder are substantially the same as the one described in the Lake patent, and since the counters per se are not a feature of this invention, they will be described only briefly herein.

Referring to forward counter 253 shown in Fig. 6d, each time magnet 255 is impulsed, emitter arm 233 is caused to move in a counterclockwise direction from one commutator segment 234 to the next. Also, when arm 233 engages segment 258, a count of five axles is indicated in counter 253.

Similarly, every time magnet 249 is impulsed, emitter arm 231 is moved in a counterclockwise direction from one commutator segment 232 to the next segment. When arm 231 engages segment 252, a count of nine axles in the reverse direction is indicated in reverse counter 247.

Each counter includes three cams which move in step with the emitter arms 231 and 233 as the counters are advanced step-by-step. These cams operate upon contacts 254, 256 and 257 in counter 253, and upon contacts 248, 250 and 251 in reverse counter 247. The arrangement is such that contacts 248, 251, 254 and 256 are open only when their respective counters 247 and 253 are standing at zero. Contacts 250 and 255, on the other hand, are closed only when the related counters stand at nine.

*Reverse counter operation.*—Provision is made in the subject toll recorder system to also count vehicle axles that pass over treadles 15 (see Fig. 1) and 315 in a reverse direction. That is, if treadle 15 is active due to the fact that relay R16 (Fig. 6b) is de-energized, a single reverse axle count is entered in reverse counter 247 (Fig. 6d) in response to each axle wheel causing contacts 262 (Fig. 6b) and 261 to close and open in succession.

Relay R13 (Fig. 6c) is energized first when contacts 262 (see also Fig. 6b) are closed via the aforedescribed circuit. This causes a circuit to be completed to relay R14 from line 245 through contacts R13a and R17c n/c. A separate hold circuit is then completed from line 245 through contacts R13c, R14b and R17c n/c.

Further movement of the vehicle in a reverse direction closes contacts 261 to thereby complete the afore-described circuit to relay R16. Relay R16 having been energized prior to R13 becoming de-energized causes a second hold circuit to relay R14 to be completed from line 245 through contacts R16c, R14b, and R17c n/c. Upon the de-energization of relay R13 when treadle contacts 262 are caused to open, a circuit is completed to relay R15 from line 245 through contacts R16a, R14c n/o and R13d. A parallel hold circuit is completed from line 245 through contacts R4b, R14b and R13d. When the vehicle is moved in a reverse direction so as to be completely off treadle 15, relay R16 is de-energized due to contacts 261 being allowed to open. The de-energization of relay R16 causes a circuit to be completed to relay R4 from line 245 through contacts R13b, R16b and R15b. Hence, referring to Fig. 6d, reverse counter magnet 249 is impulsed to add a count of one when contacts R4a close, through a circuit from line 245 contacts R9d and R4a, magnet 249, to the other side of the line.

Referring once again to Fig. 6c, the energization of relay R4 causes the de-energization of relay R15 when contacts R4b open. In turn, the de-energization of relay R15 causes the de-energization of relay R4 when contacts R15b open.

Figure 6C:
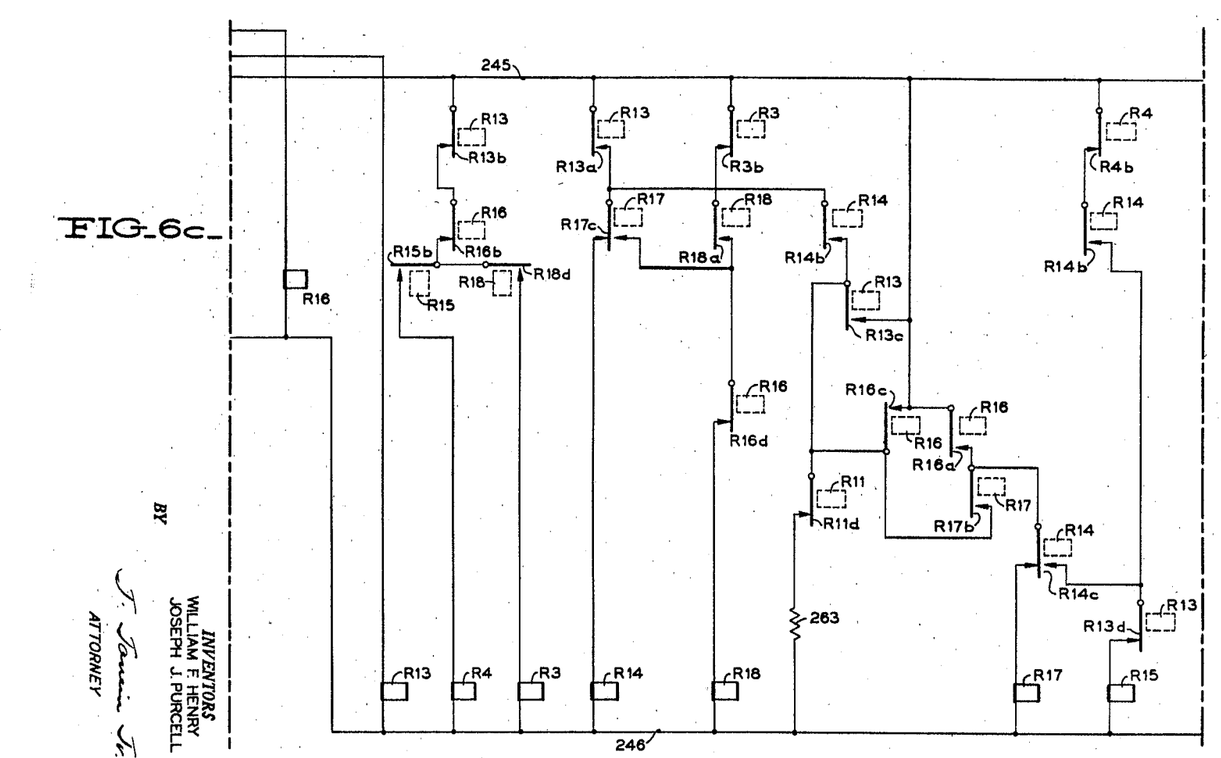
Figure 9:
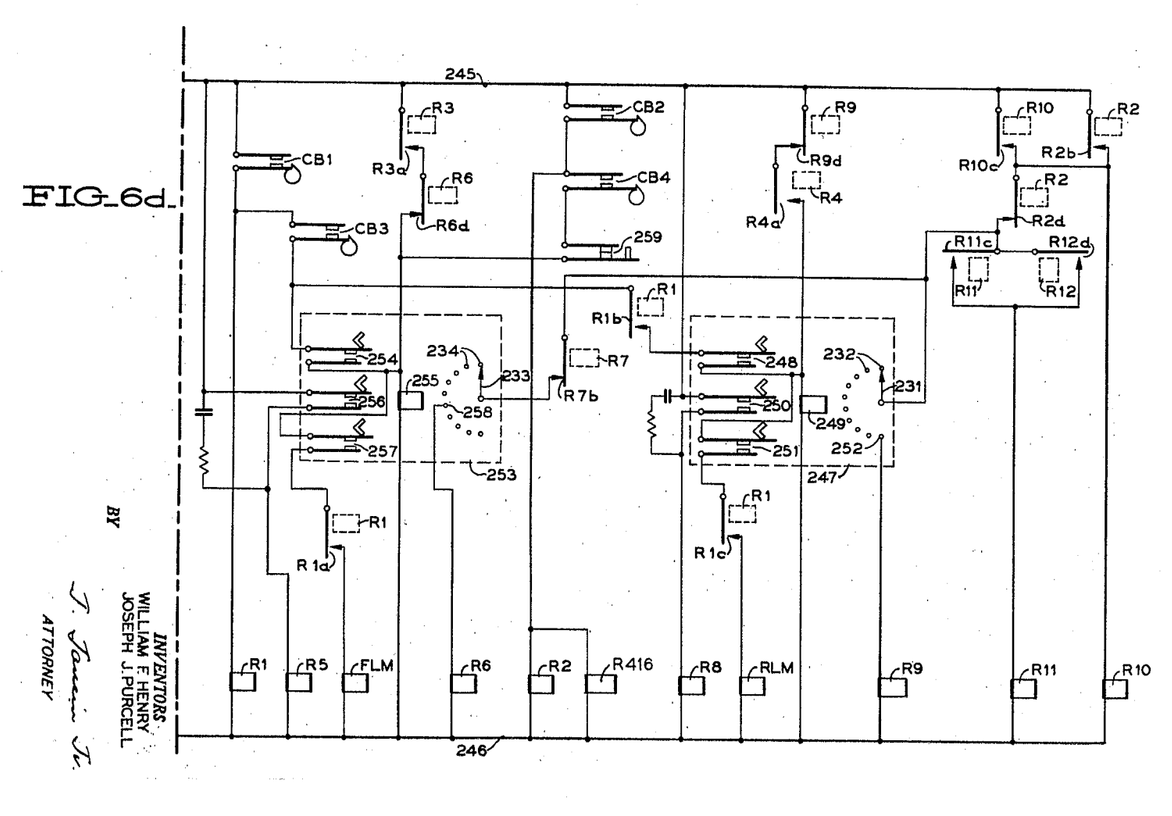

*Second treadle circuit.*—The treadle circuit shown in Fig. 6c for treadle 15 (see also Figs. 1 and 6b) is also used for treadle 315. To render treadle 315 active, however, while treadle 15 is disabled, it is necessary to cause relay R416 (Fig. 6b) to pick. As the description advances, this feature will be explained in detail.

*Normal toll recorder operation.*—As mentioned hereinbefore, the axle selection lever (not shown) is set by the toll collector who is checking the vehicle stopped opposite toll booth 12, to a position indicating the number of vehicle axles on the vehicle. After so setting the lever in axle unit 13, a trip card is inserted into the card receiver of the toll recorder to cause drive motor 39 (see Figs. 4 and 6a) to operate the drive mechanism described previously.

During the first half of the recorder cycle, cam contacts CB1 close from 5° to 160° so that reset cam CB3 directs nine equally spaced reset impulses to equal duration to forward counter 253. Inasmuch as cam contacts CB1 are closed from 5° to 160°, cam contacts CB3 are effective only during the counterclockwise movement of the variable cam associated with the print sector. Since contacts 254 (Fig. 6d) are open only when counter 253 is standing at zero, the afore-mentioned reset pulses will be directed to counter magnet 255 only if forward counter 253 contains a value other than zero, and through a reset circuit including line 245, contacts CB1, CB3, R1b, tens-contact 248, magnet 249, and the other side of the line. Assuming, for example, that counter 253 has stored therein a two-axle count from the previous toll recorder operation, eight reset impulses will be directed to magnet 255 before contacts 254 are caused to open the reset circuit.

It may be seen that the same reset impulses are directed to reverse counter magnet 249 from line 245 through contacts CB1, CB3, R1b, tens-contacts 248, magnet 249, to line 246. Contacts R1b are closed from 5° to 160° because relay R1 is controlled by cam contacts CB1. As with counter 253, contacts 248 are caused to open when counter 247 is standing at zero.

Assuming counter 253 to contain a zero axle count from the previous toll recorder operation, magnet 255 will not be energized by the reset impulses due to the fact that contacts 254 are open. Hence, the print sector 116 (see also Fig. 4) associated with counter 253 will follow bail 146 to the limit of movement in a counterclockwise direction, whereby the last, i. e., the zero, type element 144 will be at the printing station. Similarly, assuming a zero axle count to be stored in reverse counter 247, magnet 249 thereof will not be energized by the reset impulses due to the now open contacts 248. Accordingly, type sector 116 which is associated with counter 247 will move to the limit of movement in a counterclockwise direction to thereby align the zero type element with the platen.

At substantially the mid-point of the toll recorder print cycle, a print stroke is effected whereby, among other items of information, a zero is printed in reverse axles column 21 (see Fig. 3), a zero axle count is printed in error axles column 22, and the axle count of the vehicle at the toll booth is printed in axles column 20 from the type sector which is set mechanically by the axle selection lever.

After printing the afore-mentioned information upon the trip card, cam contacts CB4 direct a number of impulses to forward counter magnet 255, wherein these so-called subtractive impulses equal the tens complement of the number to which the axle selection lever 175 is set. That is, assuming the axle selection lever to be set in the two axle position, eight impulses are directed from line 245 through contacts CB2, CB4, tour-of-duty contacts 259, magnet 255, to line 246. Inasmuch as cam contacts CB2 are open during the first half of the toll recorder cycle when variable cam 177 is caused to move in a counterclockwise direction, cam contacts CB4 are ineffective. Contacts CB4 are effective during the second half of the toll recorder cycle when variable cam 177 is moved in a clockwise direction because cam contacts CB2 are closed from 200° to 355°.

As the vehicle leaves the toll booth, each axle passing over the treadle in a forward direction causes an impulse to be directed through the directional relay circuit described hereinbefore, to thereby energize forward counter magnet 255. If the toll collector set the axle selection lever in a position indicative of the correct number of axles actually on the vehicle, the axle counts directed to forward counter 253 during the time that the vehicle is passing over the axle treadle should return the counter to zero. As a result, when the next vehicle arrives at the toll booth, a zero will be printed in the error and reverse columns 22 (see Fig. 3) and 21, respectively, of the trip card.

*Reverse axles count.*—As described hereinabove, axles crossing a treadle in a reverse direction will be counted by reverse counter 247 (Fig. 6d). Any count appearing in the reverse counter will be printed on the trip card during the toll recorder cycle that the counter is returned to zero. This operation is similar to the forward counter operation. Assuming that a two axle vehicle passed over the treadle in a forward direction prior to passing over the treadle in a reverse direction, relay R4 will be energized twice, whereupon two impulses will be directed to reverse counter magnet 249. Thus, during the first half of a print cycle, reset impulses will be directed through contacts CB3 and R1b and 248 to magnet 249 so as to advance the counter to zero. However, at the time the counter is standing at a nine value, contacts 251 are closed so as to complete a circuit to latch magnet RLM from line 245 through contacts CB1, CB3, R1b, 248, 251, R1c, magnet RLM, to the other side of the line. Referring to Fig. 4, as described previously, the energization of latch magnet RLM will release latch lever 155 associated therewith so that projection 158 thereon will engage a notch 145 of type sector 116 to thereby align the two type segment 144 with platen 112.

Of course, during any toll recorder cycle when there is no count in the reverse counter, contacts 248 will be open and type segment 116 will be permitted to move in a counterclockwise direction so as to align the type segment 144 with platen 112.

*Forward axle error operation.*—Assuming that the toll collector sets the afore-mentioned axle selection lever (not shown) to a two axle position for a vehicle having three axles, a count of eight will be entered into counter 253 during the toll recorder cycle in which the trip card associated with the vehicle is processed. When the vehicle is permitted to leave the toll booth so as to pass over the treadle in a forward direction, the afore-described treadle circuit will direct three impulses to forward counter magnet 255. Hence, the counter will advance through zero to a one value. During the next following toll recorder operation for the next vehicle arriving at the toll booth, nine reset impulses will be directed through cam contacts CB3 and tens-contacts 254 in order to reset the counter from a one to a zero. The eighth impulse will advance the counter to a nine value, of course, at which time the contacts 257 are caused to close so as to energize latch magnet FLM from line 245 through contacts CB1, CB3, 254, 257, R1a, magnet FLM, to line 246. In view of the fact that the type sector 116 (see also Fig. 4) which prints in the error column of the trip card and which is associated with forward counter 253, moves in unison with the reset impulse cam for controlling contacts CB3, this type sector is stopped by a latch lever 155 when latch magnet FLM is energized to align the "−1" type symbol 144 with the platen. Hence, a "−1" will be printed on the trip card in error column 22 (Fig. 4) to indicate that the axle selection lever was set to a number of axles fewer than the actual number determined by the treadle.

Assuming that the toll collector has set the axle selection lever to a three axle position for a vehicle having two axles, the counter will stand at a nine after the vehicle crosses the treadle in a forward direction. This, of course, is due to the seven reset impulses directed through cam contacts CB4 and two treadle counts. Hence, during the following toll recorder cycle, the first reset impulse directed through cam contacts CB3 will energize latch magnet FLM as well as counter magnet 255. This will release latch lever 155 to align the first type segment 144 with the platen to print a "+1." The plus error will indicate that the axle selection lever was set to a number of axles greater than the actual number passing over the treadle.

*Signal light circuits.*—Referring to Fig. 6a, light 265 is lit as long as relay R5 (see also Fig. 6d) is energized. Since relay R5 is energized as long as counter 253 does not contain a zero, light 265 indicates the same when it is energized.

In view of the fact that light 266 is energized when contacts R11a are closed, and since relay R11 (see also Fig. 6d) is energized in response to a so-called treadle time delay, which is described in copending Henry et al. patent application Serial No. 398,358, light 266 is energized to indicate a treadle time delay.

The purpose of light 267 is similar to that for 265 in that light 267 is lit whenever reverse counter 247 is standing at a value other than zero. It may be seen that relay R8 is energized through contacts 250 whenever counter 247 is at a value other than zero.

Light 268 is energized whenever relay R10 is de-energized, i. e., after a power failure and prior to the first toll recorder operation after the said failure.

*Start control circuit.*—Full insertion of a trip card into the card receiver of a toll recorder will cause contacts 241 (Fig. 6a) to close as described previously. However, a toll recorder operation may not be effected automatically for the following reasons:

(1) Contacts R5b when open indicate that forward counters 253 (see also Fig. 6d) contains a value other than zero.

(2) Contacts R8b when open indicate that reverse counter 247 contains a value other than zero.

(3) Contacts R10a when open indicate that a power failure has occurred.

(4) Contacts R11b when open indicate that a weight has been on the active treadle causing contacts 261 (see also Fig. 6c) and/or 262 to remain closed for more than a predetermined time interval.

(5) Contacts R12b when open indicate that the bi-metal contacts R12c are closed and are causing the energization of relay R12.

Hence, whenever one or more contacts R5b, R8b, R10a and R11b are open, it is necessary to depress error switch 269 so as to close the contacts thereof and complete a circuit to solenoid 242 from line 236 through contacts R12b, 269, 241, solenoid 242, to the other side of the line. However, if contacts R12b are open due to the fact that the bi-metal contact strap has not cooled sufficiently to open the circuit to relay R12 and magnet 210, depression of error switch 269 will not complete a circuit to solenoid 242 until after contacts R12b close.

*Treadle switching circuits.*—It has already been stated that the disabled treadle may be rendered active and the active treadle may be disabled, by following a shift of the card receiver mechanism with a cyclic toll recorder operation. Referring to Fig. 6b, let it be assumed that the treadle 15 (see also Fig. 1) is active and the treadle 315 is disabled. This, as is clearly shown in Fig. 6b, is due to the fact that relay R416 is not picked. That is, the contacts 261 and 262 of treadle 15 are operatively connected via contacts R416a and R416b with the treadle relay circuits shown in Fig. 6c. At this time, the card receiver (Fig. 5) is positioned so that normally closed contacts 77 (see also Fig. 6b) are open, as are normally open contacts 76. To render treadle 315 active with respect to the toll recorder, the card receiver must first be shifted to close contacts 76 and to permit contacts 77 to close. This action will condition the toll recorder system for a treadle switching operation which, however, will not take place until the next following toll recorder operation. During the latter half portion of the aforesaid toll recorder operation, relay R413 (Fig. 6d) will pick along with relay R2 via the cam contacts CB2. As a result, relay R414 (Fig. 6b) will pick via a circuit completed from line 245 through contacts 77, 76 and R413a, relay R414, to live 246. A hold circuit for relay R414 will form immediately via the contacts R414a which parallel the contacts R413a. Furthermore, relay R415 will pick via contacts R414b. At approximately 355° of the recorder cycle, relay R413 (see also Fig. 6d) will drop out when cam contacts CB2 separate. Hence, relay R415 (Fig. 6b) will be energized by way of a hold circuit via contacts R413b and R415a. Relay R416 will, of course, pick up immediately after relay R415 has been picked in view of the fact that contacts R415b are in series circuit with relay R416 across lines 236 and 237. Thus, relay contacts R416a and R416b will transfer to operatively connect treadle 315 to the relay circuits shown in Fig. 6c by way of the connecting lines 304 and 305. In addition, contacts R416c will transfer to energize the traffic lights 15G (see also Fig. 1) and 315R, i. e., green for vehicles moving in an easterly direction and red for vehicles moving in a westerly direction.

When it is desired to disable treadle 315 once again, the card receiver mechanism (see Fig. 5) must be shifted to the left so as to open contacts 77 (see also Fig. 6b) as well as to permit normally open contacts 76 to open. This will cause relay R414 to drop out. Relay R415 will still remain energized, however, via contacts R413b and R415a. During the toll recorder cycle next following the preceding card receiver mechanism shift, relay R413 (Fig. 6d) will be picked up from 200° to 355° via cam contacts CB2. As a result, contacts R413b (Fig. 6b) will open the hold circuit to relay R415, whereas the contacts R415b will open the circuit to relay R416. The contacts R416a and R416b will return to normal status, whereby treadle 15 will be operatively connected to the toll recorder system. Furthermore, the traffic lights 15R (see also Fig. 1) and 315G will become energized so as to stop vehicular traffic in an easterly direction and to pass vehicles moving in a westerly direction.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a toll highway recorder system including a cyclically operable toll recorder for recording data relating to vehicular traffic to and from the toll highway, the combination of an In-axle treadle positioned in a toll highway entrance lane, an Out-axle treadle positioned in a toll highway exit lane, data recording means, a shiftable record receiver for holding the record in a recording position, manually operable means for shifting said record receiver to an In-position and to an Out-position, normally inoperative first circuit means adapted to operatively connect said In-treadle and said data recording means when operated, normally inoperative second circuit means adapted to operatively connect said Out-treadle and said data recording means when operated, switching means controlled by said manually operable means for conditioning for operation said first circuit means in response to the shifting of said record receiver to said In-position and for conditioning for operation said second circuit means in response to the shifting of said record receiver to said Out-position, means for effecting a cyclic toll recorder operation, and electrical circuit means operative only during the cyclic toll recorder operation for rendering operated the one of said circuit means conditioned for operation.

2. A toll highway recorder system including a cyclically operable toll recorder for recording data relating to vehicular ingress to and egress from a toll highway comprising a first treadle; a second treadle; a shiftable record receiver; data recording means; first circuit means adapted to operatively connect said first treadle and said data recording means; second circuit means adapted to operatively connect said second treadle and said data recording means; means for shifting said receiver to a first position and to a second position; electrical means for detecting movement of said receiver from one position to another position; switching means for governing said first and said second circuit means so that said first circuit means is conditioned for operation in response to the shifting of said receiver to the aforesaid first position, and said second means is conditioned for operation in response to the shifting of said receiver to the aforesaid second position; means controlled by said electrical means for governing said switching means; means for effecting a toll recorder operation; and means operative only during the cyclic toll recorder operation for operating the one of said circuits conditioned for operation and for disabling the other one of said circuit means.

3. A toll highway recorder system including a cyclically operable toll recorder for recording data relating to vehicular ingress to and egress from the toll highway comprising an In-axle treadle positioned in a vehicle lane; an Out-axle treadle positioned in the vehicle lane; data recording means; a shiftable record receiver for holding the record in a recording position; first circuit means adapted to operatively connect said In-treadle and said data recording means; second circuit means adapted to operatively connect said Out-treadle and said data recording means; a first pair of normally open contacts positioned adjacent said record receiver; a second pair of normally closed contacts positioned adjacent said record receiver; manually operable means for shifting said record receiver to an In-position so as to close said first pair of contacts, and to an Out-position so as to open said second pair of contacts; electrical circuit means including said first and said second pair of contacts connected in series circuit; switching means controlled by said electrical circuit means for conditioning for operation the one of said circuit means associated with the one of said axle treadles corresponding to the position of said record receiver; means for effecting a cyclic toll recorder operation; and electrical timing means operative during a toll recorder operation for operating the one of said circuit means conditioned for operation and for disabling the other one of said circuit means.

References Cited in the file of this patent

UNITED STATES PATENTS

| | | |
|---|---|---|
| 2,621,101 | Cooper | Dec. 6, 1952 |
| 2,672,393 | Cooper | Mar. 16, 1954 |